US010039051B2

(12) United States Patent
Elhaddad et al.

(10) Patent No.: US 10,039,051 B2
(45) Date of Patent: *Jul. 31, 2018

(54) PEER-TO-PEER DISCOVERY

(71) Applicant: Microsoft Technology Licensing, LLC, Redmond, WA (US)

(72) Inventors: Mahmoud S. Elhaddad, Kirkland, WA (US); Mitesh K. Desai, Sammamish, WA (US); Henrique M. A. Filgueiras, Kirkland, WA (US); Amer A. Hassan, Kirkland, WA (US); Trideepraj Roychoudhury, Snoqualmie, WA (US); Mukund Sakaranarayan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/063,481

(22) Filed: Mar. 7, 2016

(65) Prior Publication Data
US 2016/0192282 A1 Jun. 30, 2016

Related U.S. Application Data

(63) Continuation of application No. 13/410,098, filed on Mar. 1, 2012, now Pat. No. 9,282,449.

(51) Int. Cl.
*H04W 8/00* (2009.01)
*H04W 48/16* (2009.01)
*H04L 29/08* (2006.01)

(52) U.S. Cl.
CPC .......... *H04W 48/16* (2013.01); *H04L 67/104* (2013.01); *H04W 8/005* (2013.01)

(58) Field of Classification Search
CPC ..... H04W 8/005; H04W 76/023; H04W 4/08; H04W 4/008; H04L 67/104
See application file for complete search history.

(56) References Cited

U.S. PATENT DOCUMENTS

2005/0058109 A1  3/2005  Ekberg
2005/0128958 A1  6/2005  Hamdan
(Continued)

FOREIGN PATENT DOCUMENTS

CN      101772980 A       7/2010
KR   1006772160000 B1     2/2007
(Continued)

OTHER PUBLICATIONS

WiFi_P2PTechnical_Specification_v1.2.pdf.*
(Continued)

*Primary Examiner* — Wing F Chan
*Assistant Examiner* — Raji Krishnan
(74) *Attorney, Agent, or Firm* — Wade IP Law LLC

(57) ABSTRACT

A wireless device that discovers other wireless devices for the formation of a peer-to-peer connection may perform a scan that is limited in duration and power consumption. The scan nonetheless is highly likely to discover a device, if a discoverable device exists. In addition, the scan may be performed in compliance with parameters of a peer-to-protocol such that the scan may be readily implemented in a wireless device, in some embodiments even as a firmware upgrade on a wireless network interface card. Parameters of the scan may be adjusted to increase the likelihood that, if the scan completes without discovering a device, no discoverable device exists. The scan may be used in an overall process in which discovery ends or the scan is selectively repeated following an unsuccessful scan, without entering a find phase.

20 Claims, 12 Drawing Sheets

(56) References Cited

U.S. PATENT DOCUMENTS

| | | |
|---|---|---|
| 2006/0023686 A1 | 2/2006 | Jeong et al. |
| 2006/0187858 A1 | 8/2006 | Kenichi et al. |
| 2008/0025282 A1* | 1/2008 | Hong .................. H04L 47/14 370/342 |
| 2008/0096501 A1 | 4/2008 | Salomone et al. |
| 2009/0017861 A1 | 1/2009 | Wu et al. |
| 2009/0086702 A1 | 4/2009 | Julian et al. |
| 2010/0058459 A1 | 3/2010 | Li et al. |
| 2010/0271959 A1 | 10/2010 | Qi et al. |
| 2010/0284334 A1 | 11/2010 | Shin et al. |
| 2010/0322213 A1 | 12/2010 | Liu et al. |
| 2011/0085453 A1 | 4/2011 | Wu et al. |
| 2011/0161697 A1* | 6/2011 | Qi .................. G06F 1/3209 713/320 |
| 2012/0134349 A1* | 5/2012 | Jung .................. H04W 8/005 370/338 |
| 2012/0151089 A1 | 6/2012 | Ponmudi et al. |
| 2012/0155350 A1 | 6/2012 | Wentink et al. |
| 2012/0158981 A1* | 6/2012 | Desai .................. H04L 67/1093 709/230 |
| 2012/0182890 A1* | 7/2012 | Li .................. H04W 8/005 370/252 |
| 2012/0250576 A1* | 10/2012 | Rajamani .................. H04W 8/005 370/254 |
| 2012/0278389 A1* | 11/2012 | Thangadorai .......... H04W 84/20 709/204 |
| 2013/0034023 A1* | 2/2013 | Jung .................. H04L 67/104 370/255 |
| 2013/0065627 A1* | 3/2013 | Jung .................. H04L 67/104 455/515 |
| 2013/0148642 A1* | 6/2013 | Abraham .............. H04W 8/005 370/338 |
| 2013/0155884 A1 | 6/2013 | Wang et al. |
| 2013/0204962 A1 | 8/2013 | Estevez et al. |
| 2013/0232253 A1* | 9/2013 | Elhaddad .............. H04W 8/005 709/224 |
| 2013/0286937 A1* | 10/2013 | Liu ...................... H04W 48/16 370/328 |
| 2013/0322297 A1 | 12/2013 | Dominguez |

FOREIGN PATENT DOCUMENTS

| | | |
|---|---|---|
| KR | 1020100121411 A | 11/2010 |
| KR | 1020120010259 A | 2/2012 |
| WO | 2009016800 A1 | 2/2009 |
| WO | 2010142468 A1 | 12/2010 |

OTHER PUBLICATIONS

"Wi-Fi Peer-to-Peer (P2P) Technical Specification", In Wi-Fi Alliance Technical Committee P2P Task Group, Draft Version 1.2, Dec. 14, 2011, 159 Pages.

"Wi-Fi Peer-to-Peer (P2P) Technical Specification", In Wi-Fi Alliance Technical Committee P2P Task Group, Draft Version 1.14, Jun. 25, 2010, 154 Pages.

"Final Office Action Issued in U.S. Appl. No. 13/410,098", dated Mar. 23, 2015, 26 Pages.

"Non Final Office Action Issued in U.S. Appl. No. 13/410,098", dated Feb. 20, 2014, 27 Pages.

"Notice of Allowance Issued in U.S. Appl. No. 13/410,098", dated Sep. 21, 2015, 14 Pages.

"Corrected Notice of Allowability Issued in U.S. Appl. No. 13/410,098", dated Jan. 29, 2016, 2 Pages.

"Supplementary Search Report Issued in European Patent Application No. 13755195.8", dated Oct. 16, 2015, 6 Pages.

"International Search Report and Written Opinion Issued in PCT Application No. PCT/US13/28605", dated Jun. 26, 2013, 9 Pages.

Pering, et al., "Exploiting Radio Hierarchies for Power-Efficient Wireless Device Discovery and Connection Setup", In Proceedings of the 18th International Conference on VLSI Design, Jan. 3, 2005, 6 Pages.

"First Office Action and Search Report Issued in Chinese Patent Application No. 201380011930.0", dated Aug. 25, 2016, 13 Pages.

* cited by examiner

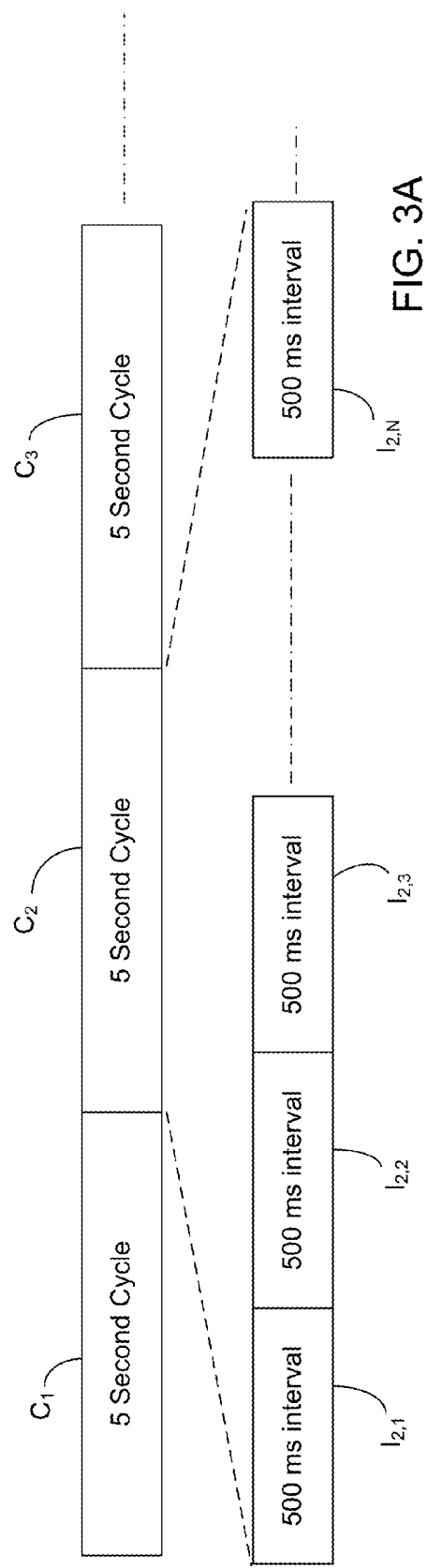
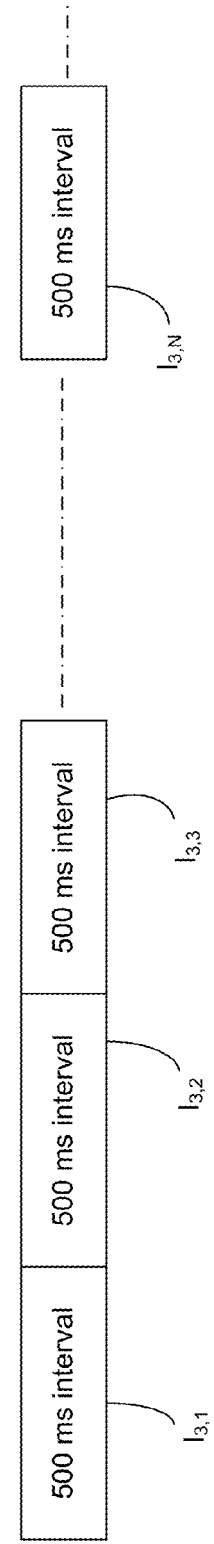
FIG. 3A
FIG. 3B

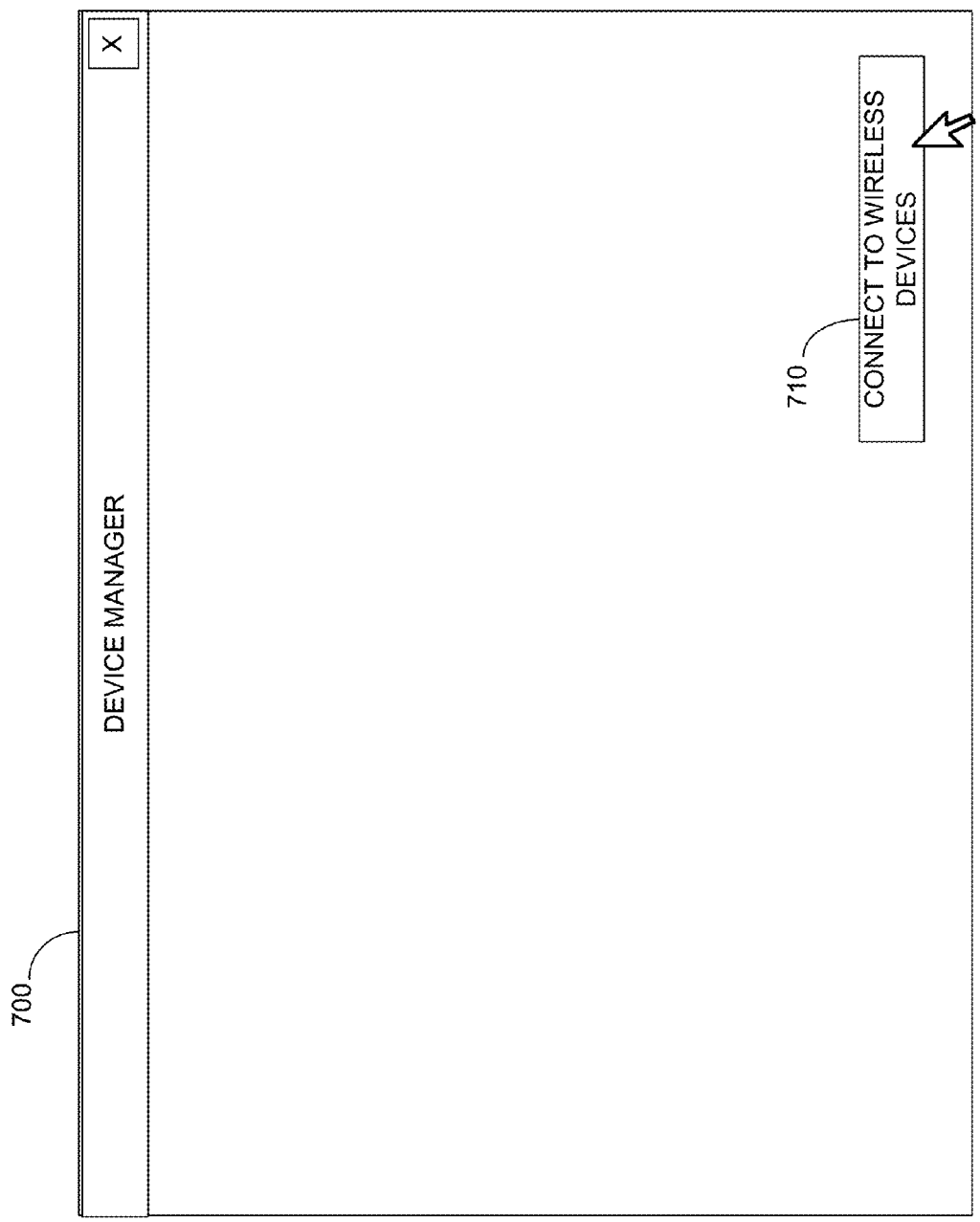

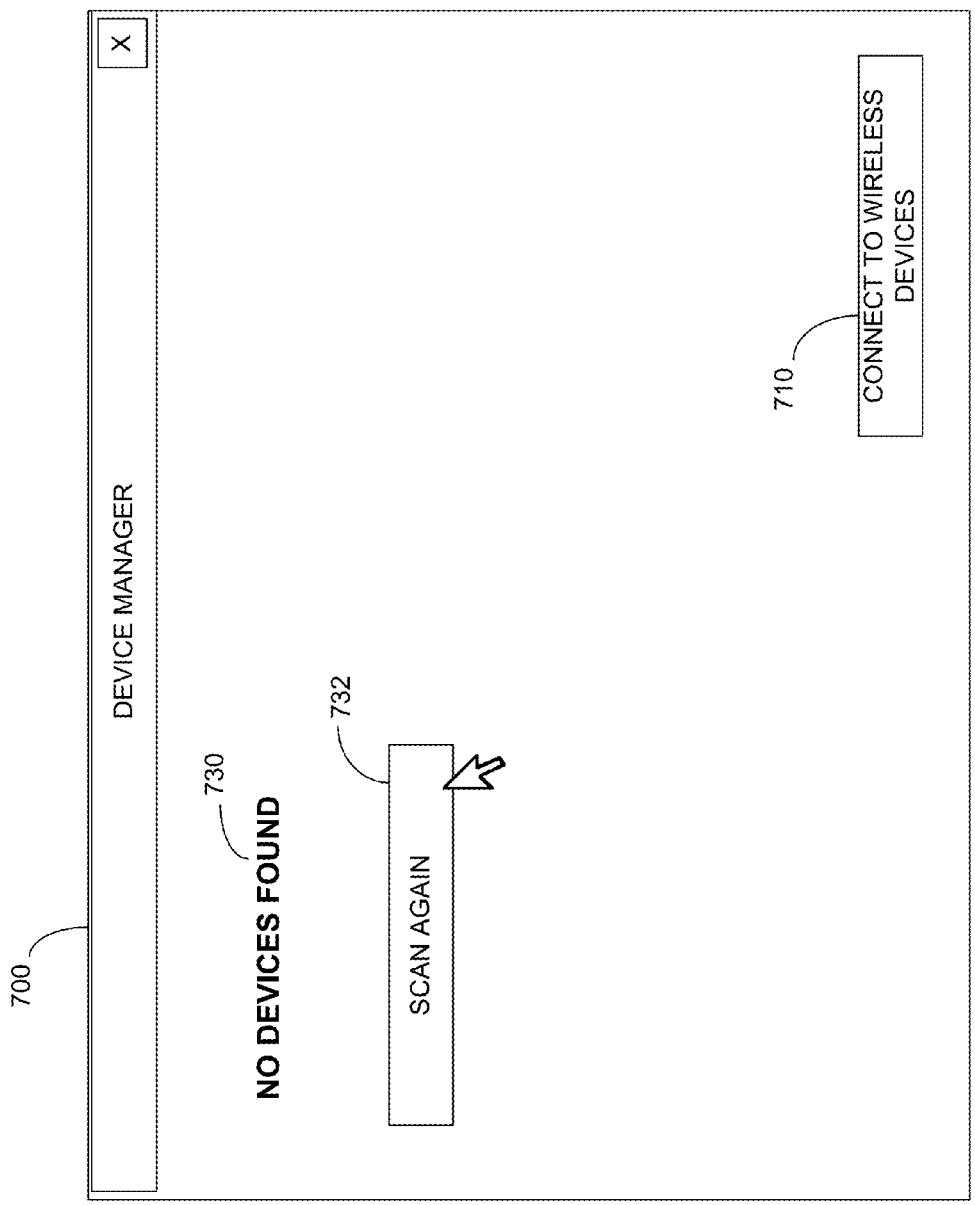

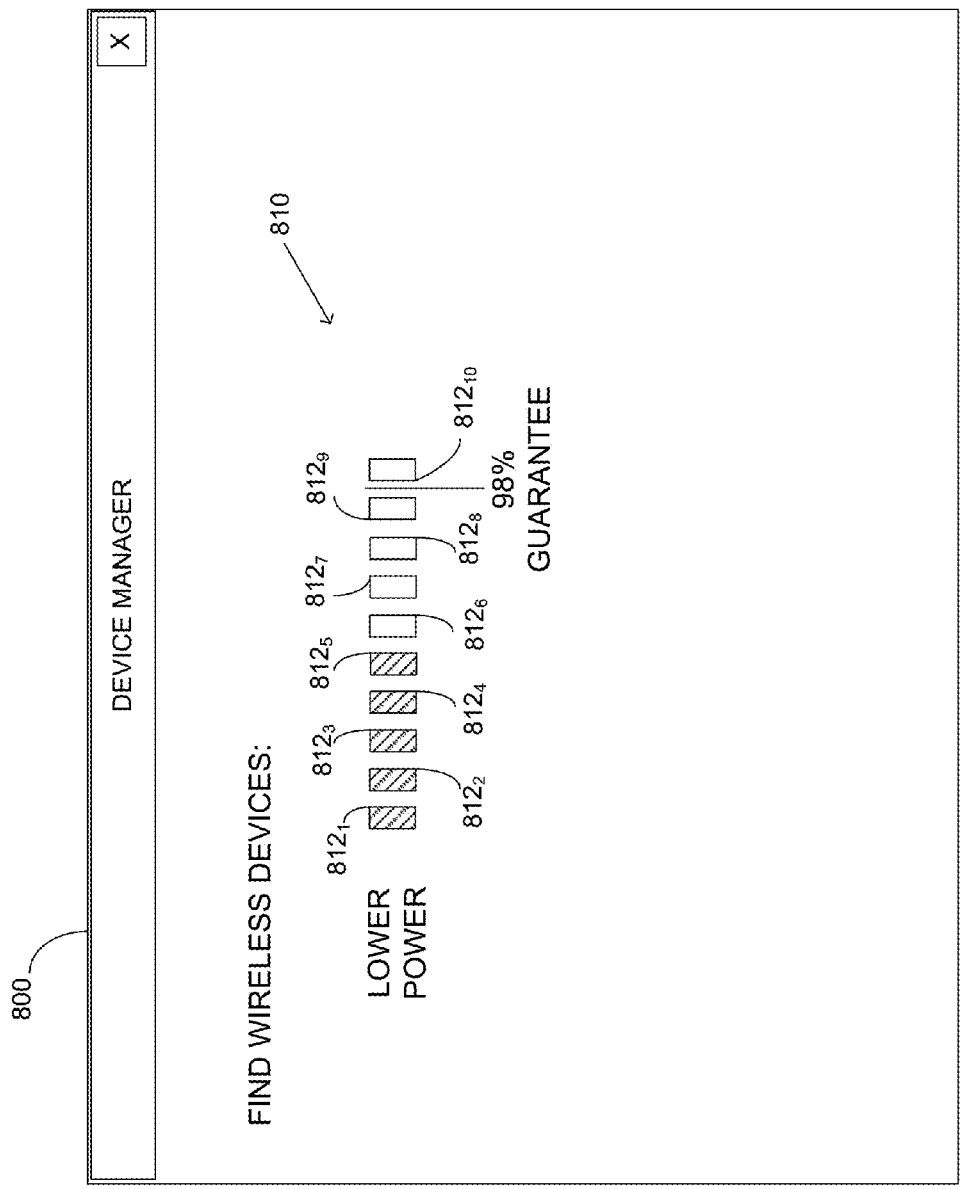

PEER-TO-PEER DISCOVERY

PRIORITY INFORMATION

This application claims priority from U.S. patent application Ser. No. 13/410,098, filed Mar. 1, 2012, the contents of which are incorporated herein by reference in its entirety.

BACKGROUND

Computer networking allows a computer to perform functions that require interaction with other computers. Through these interactions, a computer can obtain information of various types. Network connections support functions such as sending e-mails, downloading audiovisual content from the Internet or accessing electronic files stored on a server that is accessible by many co-workers.

Wireless networks can be particularly powerful, allowing network functions to be performed by computers that are highly portable. Though, wireless networks pose a problem that does not exist when a computer is connected to a wired network by attaching a wire to the computer. For a computer to connect wireless to a network, the computer must determine that there is another wireless device in its vicinity with which it can form a network or through which it can connect to a network.

Some networks operate in an infrastructure mode. In infrastructure mode, a wireless device acts as an access point to the network. A wireless device that is already configured with information about the access point can connect to the access point. Once connected, the access point recognizes, and appropriately routes, packets sent by the wireless device. If the wireless device is not already configured for communication with the access point, it may be necessary for the wireless device to "discover" the access point.

In general, wireless protocols provide for "discovery". Discovery involves, in some form, communications between a wireless device seeking to discover one or more other wireless devices and the wireless device being discovered.

Infrastructure mode protocols can be designed with the assumption that the access point will be specifically configured for its role as an access point. Accordingly, the access point may be more active in implementing the communications that allow discovery. In accordance with some protocols, the access point may periodically transmit beacons on one or more channels used by the access point. Devices seeking to discover a network access point can perform a "scan." The scan may be passive in that the device seeking to discover an access point does not transmit. Rather, it successively "listens" on each of the channels on which a beacon could be transmitted in an attempt to receive a beacon.

A passive scan may involve a wireless device that is seeking to discover an access point listening on each channel for an interval that is long enough that, if an access point is transmitting beacons on that channel, a beacon would be detected. For example, if a protocol specifies that an access point is to transmit a beacon every 100 msec, the wireless device performing a passive scan may listen on each channel that could be in use by an access point for at least 100 msec.

Some protocols also support an active scan. In an active scan, a device seeking an access point may transmit a message, sometimes called a "probe request," on channels that may be in use by an access point. If an access point is using a channel on which a probe request is transmitted, the access point will respond to the probe request. A device actively scanning for an access point may more quickly determine if an access point is using a specific channel. For example, some protocols may specify that a device transmitting a probe request should receive a response to the probe within 20 msec if there is an access point on the channel on which the probe request was transmitted. Accordingly, the device needs only to listen for 20 msec on a channel before concluding that there is no access point on the channel. However, active scanning requires transmissions on any channel on which a device is to be discovered and, by regulation, transmissions for scanning may be prohibited on some channels.

Networks operating in an ad hoc mode similarly employ discovery that involves transmitting and listening. However, in ad hoc mode, there may be no fixed access point. Instead, devices that have discovered each other may pair, and as part of forming an ad hoc connection, determine that one of the devices will play a role similar to an access point in controlling the connection. In the Wi-Fi Direct protocol, this device is termed the Group Owner and is selected as part of group owner negotiation, which does not occur until after discovery.

During discovery phase, each device may perform a sequence of actions that can involve both intervals during which the device sends messages and intervals during which the device listens for other devices sending message. Two devices discover each other when one is transmitting a discovery message on the same channel on which the other is simultaneously listening for a discovery message.

In accordance with the Wi-Fi Direct protocol, discovery may include a "scan" phase and a "find" phase. During the scan phase, a device may perform an active or a passive scan, in much the same what that a device would perform a scan in seeking to connect to an infrastructure network. Though, because there is no guarantee that a device, though available for discovery, will be transmitting discovery messages (e.g., beacon frames) while another is listening for discovery message. As a result, a scan, particularly a passive scan, may not discover an available device.

A device performing discovery under Wi-Fi Direct may enter the "find" phase to find devices not found during the scan phase. During the find phase, a device uses only channels that are designated as "social channels." During the find phase, a device alternates between search and listen operations. During search, a device may transmit a discovery message on a social channel and waits for responses, it may then move on to the next social channel and repeat the process. During listen, the device listens for a discovery message on a "social channel" for an amount of time randomly selected to be between approximately 100 to 300 msec.

SUMMARY

A wireless device configured to operate according to a peer-to-peer communication protocol may be configured to operate according to a method of scanning that, a high percentage of the time, results in discovery of any discoverable devices. The scan phase implemented by the wireless device may comply with parameters specified as part of the peer-to-peer protocol, but may incorporate other parameters that are not specified. As a specific example, discovery may be performed according to a Wi-Fi Direct protocol in which the average time between visits to social channels is specified, but the specific order and timing of those visits is not specified. An improved scan may achieve the specified time between visits but in accordance with an approach for the selecting the timing of individual visits that is not required by the Wi-Fi Direct protocol.

In some embodiments, the scan may have one or more scanning cycles each of which is divided into intervals. One interval may be randomly selected for an extended scan. During the extended scan interval, the wireless device may send probe requests in each active scanning channel and listen for responding devices. In each of the other intervals, the wireless device may visit each social channel to transmit probe requests and listen for responses. In each interval, the time of a visit to a social channel may be randomly selected. However, the visit time may be randomly selected from a range of times, established relative to the time of a visit in a proceeding interval, so as to achieve an average time between visits to each social channel that complies with a predetermined value. The predetermined value may be selected to comply with a peer-to-peer protocol. While not scanning in the extended scan interval or scanning on the social channels, the wireless device may listen in one or more listen channels.

The probability that another discoverable device will be discovered through a scan implemented in this way increases in proportion to the number of intervals in a scanning cycle. Accordingly, the number of intervals may be different in different embodiments. In each embodiment, though, the number of intervals may be set to achieve a probability of successful discovery that yields acceptable performance. Moreover, if a device is not discovered as a result of one scanning cycle, a find phase may be entered to increase the likelihood that a device will be discovered, if one exists.

Based on the expectation that using such a scan pattern, a device is highly likely to be discovered if present, the course of discovery may be altered to reduce the average time spent on discovery or the amount of power, on average, consumed during discovery. The total time spent on a scan may be limited. For example, the scan may be limited to 5 seconds or less. Discovery may end following a scan if no device is discovered. Alternatively, additional scanning cycles may be performed to increase the likelihood that, if a discoverable device exists, it will be discovered. In either case, discovery may be performed without entering the find phase.

The foregoing is a non-limiting summary of the invention, which is defined by the attached claims. It should be appreciated that the foregoing techniques may be used together, singly or in any suitable combination.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A and 3B are timelines illustrating aspects of a scan phase of discovery that is consistent with a peer-to-peer protocol;

FIGS. 7A, 7B and 7C are conceptual sketches of a graphical user interface displayed by a wireless device to facilitate a user of the wireless device controlling device discovery;

FIG. 8 is a sketch of a graphical user interface presented by a wireless device to facilitate a user of the wireless device setting parameters to achieve a performance guarantee of a scan phase of peer-to-peer device discovery.

DETAILED DESCRIPTION

Figure 1:
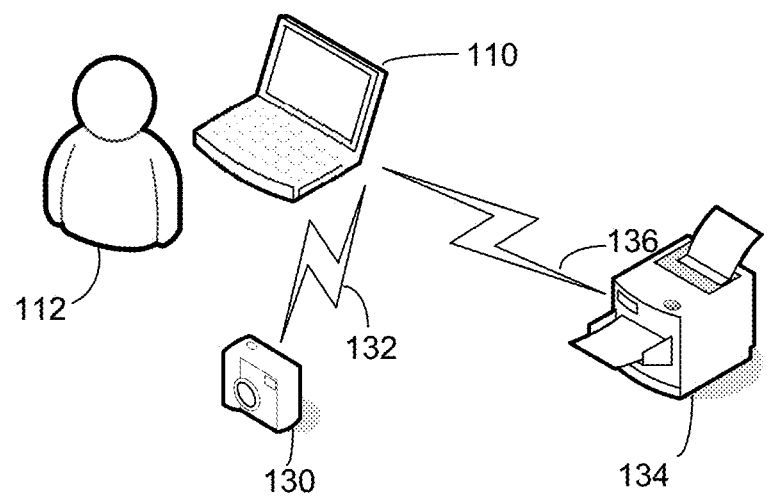
FIG. 1 is a sketch of an exemplary system in which a wireless device may discover remote devices.

The Inventors have recognized and appreciated that operation of wireless devices would be more satisfying to users of those wireless devices if a wireless device could discover other devices with which to connect faster in most cases—even if a very small percentage of the time a discoverable device is not discovered in a single pass through a scan phase. Moreover, the inventors have recognized and appreciated that standard protocols for wireless communications, such as the Wi-Fi Direct protocol, though specifying some discovery parameters, do not define a device discovery process that achieves the objectives of providing fast discovery in most cases. Nonetheless, a fast scan phase performed in accordance with parameters that are specified as part of the peer-to-peer protocol may facilitate incorporation of the improved scan into devices otherwise configured for peer-to-peer communication.

For example, the Wi-Fi Direct protocol provides for "social channels," which devices may use to facilitate discovery, and specifies parameters of the discovery phase, such as average time between visits to a social channel and dwell time in a social channel. According to the protocol, a device in the scan phase is to visit each social channel on average at a predetermined rate, such as once every 500 ms. The protocol, however, does not specify how these visits are to be scheduled in a way that ensures that two devices, each seeking to connect to another device, will discover each other with a specific probability.

Moreover, the inventors have recognized and appreciated that, though a find phase may be entered by a device that does not discover another device as a result of performing a scan, in some embodiments, the find phase may be omitted. If the scan phase can lead to the discovery of a device, if one exists, with a suitably high probability, the find phase may be omitted to provide a faster result when no device is available. In scenarios in which the wireless device has received user input indicating that that the user believes a discoverable device is present, additional actions may be taken following completion of the scan phase. Those additional actions may include repeating the scan phase or entering a find phase.

Nonetheless, allowing discovery to be performed without requiring a find phase may enable a wireless device to support a broader range of functions. In accordance with some peer-to-peer protocols, a device that supports a peer-to-peer connection may connect to an access point of an infrastructure network. However, when operating in a find phase, a wireless device may use its radio to visit channels other than the one used for the communication with the access point. The length of the find phase may exceed timeout intervals associated with communication with the access point. As a result, communication with the access point may be disrupted. The nature of the disruption may depend on the length of the delay. However, leaving the channel used by the access point to perform a find phase may result in disruption, such as lost packets or even loss of the connection. Such disruption may occur, for example, with a find phase of 300 msec or longer.

A related problem might occur if a device already operating as a group owner in accordance with a peer-to-peer protocol is required to leave the channel on which its group is operating to perform aspects of discovery. To avoid such problems, a device may be configured to operate in ways to improve its discoverability without dissolving a group it is controlling. As one example, a device operating as a group owner on a passive scan channel may be configured to leave the passive scan channel without dissolving its group in order to transmit messages announcing its presence on an active scan channel.

As a specific example, the Wi-Fi Direct protocol supports power savings modes in which a group owner can become temporarily unavailable. The group does not dissolve while the group owner is unavailable because the protocol supports mechanisms for other devices to be informed of a temporary absence of the group owner. These or other suitable mechanisms may be used to avoid the group being dissolved because the group owner does not respond for some period of time. During that period of time, the group owner need not enter a low power state. Rather, it may switch to an active scan channel where it can transmit announcements of its presence. These announcements may be in any suitable format, and may indicate the passive scan channel on which the group owner can be contacted.

Similar techniques alternatively or additionally may apply for a wireless device that is not a group owner. In that case, during the scan phase, a device may listen for probe requests on a home channel while not actively visiting channels. However, if the home channel is a passive scan channel, other devices will not transmit probe requests on those channels. Accordingly, listening on the home channel may not facilitate discovery. Instead, the device may transmit on an active scan channel an indication of its presence, which may include an indication of its home channel.

The forgoing techniques may be used alone or together in any suitable combination in any suitable environment. FIG. 1 illustrates an exemplary computing environment. In the example of FIG. 1, a user 112 is operating computing device 110. Computing device 110 is equipped with a wireless network interface card and so can operate as a wireless device. As part of operating computing device 110, user 112 may request operations that are performed through interaction with other devices. Those interactions may be performed by establishing wireless connections to those devices.

In the example of FIG. 1, computing device 110 is illustrated as a laptop computer. Though, it should be appreciated that the form factor of computing device 110 is not a limitation on the invention. Computing devices configured as tablets, SmartPhones or with any other suitable form factor may be configured and operated according to embodiments of the invention. Moreover, it should be appreciated that any wireless device may play any role in a peer-to-peer group. Accordingly, it is not a requirement that any of the devices in the group be a computing device.

User 112 may interact with computing device 110 using techniques as are known in the art to control computing device 110 to wirelessly connect with other devices.

FIG. 1 illustrates exemplary peer-to-peer wireless connections. Computing device 110 is shown to have already formed connections 132 and 136 to camera 130 and printer 134, respectively. In this case, camera 130 and printer 134 are examples of wireless devices with which computing device 110 may connect in order to exchange data.

Camera 130, printer 134 and computing device 110 may communicate over wireless connections 132 and 136 using a peer-to-peer. In this example, camera 130, printer 134 and computing device 110 may form a persistent group according to that peer-to-peer protocol. Though, in alternative embodiments, computing device 110 may form a first group with camera 130 and a second group with printer 134. Accordingly, it should be appreciated that a group may be made up of any suitable number of devices, including only two devices.

Wireless connections 132 and 136 may be formed according to any suitable peer-to-peer protocol. In this example, connections 132 and 136 are formed using an extension of the Wi-Fi protocol, referred to as Wi-Fi Direct.

Prior to forming a peer-to-peer connection, a device must "discover" other devices to participate in the connection. The Wi-Fi Direct, and other peer-to-peer protocols, may support device discovery. In this example, the Wi-Fi Direct protocol specifies formats for messages that a device seeking to discover another device may transmit. The protocol may also specify message formats for an appropriate response.

A message transmitted by a device seeking to discover a remote device may be referred to as a probe request. A response may be referred to as a probe response. Different protocols may have different formats for a probe request and a probe response. Moreover, different protocols may use different terminology to describe a message seeking a response from a discoverable device and such a response. Accordingly, neither the format nor specific name to identify a probe request or a probe response is critical to the invention, and messages in any suitable format may be used.

For discovery to be effective, the message formats used by the devices will be compatible such that a device transmitting a probe request will recognize a probe response. In addition to using a common format, other criteria may need to be met. For example, the devices must operate in close enough proximity for one device to receive wireless communications from another. FIG. 1 illustrates a scenario in which devices, such as computing device 110, camera 130 and printer 134 operate in close enough proximity to exchange wireless communications.

Other criteria also may determine whether a device is "discoverable," such that the device could be found by another device performing device discovery according to a protocol. As an example of a criteria, to be discoverable, a wireless device may need to have its radio turned on. Alternatively or additionally, to be discoverable, a device may need to be operating in a state in which it sends or responds to messages according to the device discovery portions of the protocol.

It should be appreciated, however, that even if a device is "discoverable," transmission of a discovery message will not necessarily result in a reply from that device. Each device may operate on a limited number of wireless channels at a time. Many wireless devices have a single radio, allowing them to transmit or receive on one wireless channel at a time. Accordingly, successful discovery requires a device seeking to discover a remote wireless device to be transmitting on a channel at the same time that the remote device has its radio tuned to listen on the same channel. Accordingly, the specific sequence of operations performed by wireless devices that are performing discovery or are discoverable may impact the success of device discovery. Controlling a wireless device to transmit on specific channels and at specific times as described herein may improve the chances of successful discovery.

Figure 2:
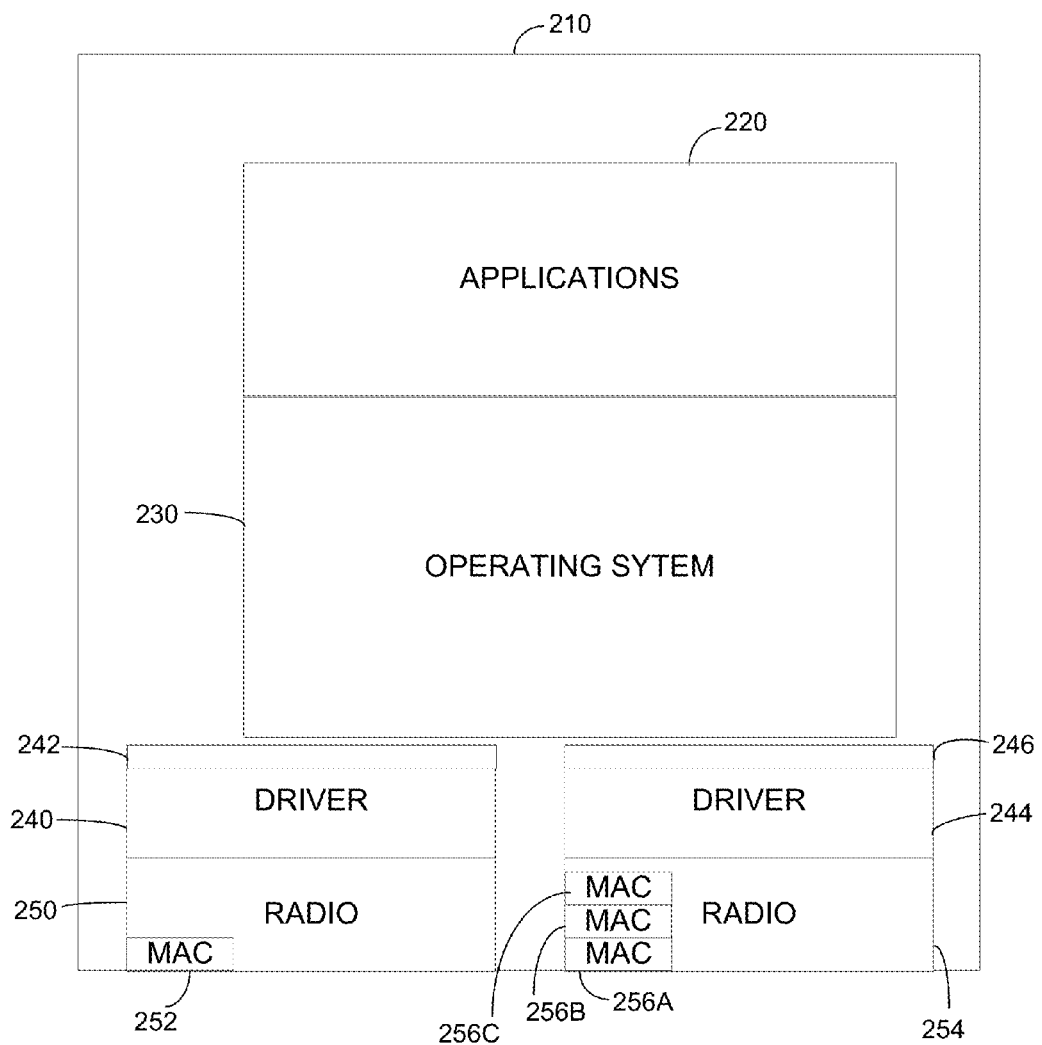
FIG. 2 is an architectural block diagram of a wireless device that may perform device discovery.

Wireless devices operating according to a peer-to-peer wireless protocol, adapted to include discovery as described herein, may be implemented in any suitable way. An exemplary embodiment is provided in FIG. 2. FIG. 2 illustrates, at a high level, an architecture for computing device 210 that may be operated to form peer-to-peer wireless connections, such as connections 132 and 136 (FIG. 1). In the example of FIG. 2, computing device 210 includes two radios, radio 250 and radio 254. Each of the radios may be adapted to send and receive wireless communications. Radio 250, for example, may be for wireless communication in a cellular band, for example. Radio 254, for example, may be used to form connections according to the Wi-Fi protocol, including peer-to-peer connections 132 and 136.

In this example, radio 250 has a media access control (MAC) address 252. The MAC address may be a unique identifier associated with radio 250 such that it may be used to distinguish radio 250 from radio 254 and also from other cellular devices. Accordingly, the MAC address 252 may be included in packets sent by radio 250 to indicate that the frame was sent by radio 250 or may be included in packets directed to radio 250 to indicate that a frame is intended for radio 250.

MAC address 252 may be assigned to radio 250 in any suitable way. It may be assigned, for example, by the manufacturer of radio 250. Though, in some embodiments, MAC address 252 may be assigned by a cellular carrier or read from a personality module associated with a cellular service.

Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. Rather, driver 240 may translate the commands, in the standardized format of interface 242, into specific control signals that are applied to radio 250. Additionally, driver 240 may be programmed to perform certain low level functions associated with cellular communication. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

Though driver 240, and in some instances radio 250, may automatically perform low level functions associated with establishing and maintaining a cellular connection, higher level functions may be performed under control of operating system 230 or applications 220. In some embodiments, an application 220 or operating system 230 may provide a user interface such that ultimate control of cellular communication is provided by a user of computing device 210.

In the embodiment illustrated in FIG. 2, computing device 210 also includes a radio 254. While radio 250 may be used, for example, for cellular communication, radio 254 may be used to form one or more peer-to-peer connections, such as connections 132 and 136 or for wireless communication with an access point in an infrastructure network.

Radio 254 is incorporated into computing device 210 with generally the same architecture as radio 250. Radio 254 is associated with a driver 244 that provides a mechanism for operating system 230 to control radio 254. Driver 244 has an interface 246 through which operating system 230 may send commands to driver 244 and driver 244 may provide status to operating system 230. Interface 246, like interface 242, may be a standardized interface such that operating system 230 may communicate with driver 244 using a similar set of commands as are used to control driver 240. Though, because radio 254 is used to implement peer-to-peer connections or connections to an access point, driver 244 may respond to different or additional commands than driver.

As an additional difference between radios 250 and 254, radio 254 is illustrated as having multiple MAC addresses. In contrast, radio 250 includes a single MAC address 252. Here, MAC addresses 256A, 256B and 256C are illustrated. Multiple MAC addresses, for example, may be assigned by a manufacturer of radio 254 or the MAC addresses may be assigned in any suitable way. Alternatively, one or more of the MAC addresses may be assigned based on an identifier of the user of computing device 210.

Having multiple MAC addresses allows radio 254 to appear to devices external to computing device 210 as multiple entities, each with a separate MAC address. As an example, if computing device 210 is separately communicating as a group owner in a first peer-to-peer group and as a client in a second peer-to-peer group, separate entities may be established for the group owner and the client. Devices external to computing device 210 may address packets intended to be processed by computing device 210 as a group owner in the first group with a first MAC address. Packets intended to be processed as a client in the second group may be addressed with a second MAC address. Similarly, computing device 210 may insert the first MAC address in packets coming from the group owner; packets from the client may include the second MAC address.

To allow operating system 230 to associate its interactions with driver 244 with a specific one of those entities, internal to computing device 210, each of the entities may be represented as a port. Accordingly, operating system 230 may send commands to or receive status information from each such entity through a port associated with that entity.

Each of the ports may be configured to perform functions appropriate for the type of entity the port represents. An embodiment in which computing device 210 operates according to Wi-Fi Direct, which is used herein as an example of a peer-to-peer protocol, a device that is part of a peer-to-peer group may take on a role of a group owner or a client. A group owner may be required in accordance with a wireless protocol to send certain types of action frames and respond to other types of action frames in specified ways. A device configured as a client may send different action frames and responses or may send the same action frames and responses in different contexts.

Though, it should be appreciated that a group owner and a client are just two examples of the roles that radio 254 and driver 244 may be configured to perform. As another example, an entity may be configured as neither a group owner nor a client. Rather, an entity may be assigned a role as a controller that manages interactions with other devices to form a group and determine the role of computing device 210 in that group.

Though FIG. 2 illustrates separate radios, radio 250 and radio 254, in embodiments in which infrastructure connections and peer-to-peer communications operate using the same frequency channels, a single radio may be used. In such an embodiment, entities performing roles associated with infrastructure communication and entities performing roles associated with peer-to-peer communications may be implemented with the same radio.

In some embodiments, the specific functions performed by radio 254 and the specific uses made of MAC addresses 256A . . . 256C may be controlled through computer executable instructions which may form a portion of driver 244 or a portion of operating system 230. In some embodiments, those computer executable instructions may be stored on a hard drive or other form of computer memory within wireless device 210. Though, it should be appreciated that some or all of the control functions for radio 254 may be stored as firmware on a network interface card incorporating radio 254. Such instructions may control any suitable function, including operations that are part of discovery for a peer-to-peer protocol.

In some embodiments, some functions may be partially implemented by instructions within operating system 230 and/or instructions within driver 244 and/or instructions that are implemented in firmware of a network interface card. As a specific example, instructions that are part of firmware or part of driver 244 may implement a function such as detecting a probe request and responding with a probe response. The radio may be configured to perform that function by a command issued from a component of operating system 230. A component, such as a device manager within operating system 230, may issue such a command through interface 246.

Radios in computing device and control of those radios through programs are known in the art. Accordingly, radio 254 may be configured using known techniques to perform any suitable function. One such function that may be performed is device discovery. In some embodiments, discovery operations as described herein may be performed by software controlling a conventional network interface card or as a firmware update to a network interface card. In this way, such operations may be performed even if not incorporated in a device as part of its manufacture.

In some embodiments, a wireless device such as computing device 210 may be controlled to perform device discovery in a manner that is consistent with a peer-to-peer protocol. As an example, device discovery in accordance with the Wi-Fi Direct protocol may be performed.

As is known in the art, the Wi-Fi Direct protocol does not specify specific actions during specific intervals of discovery. In accordance with some embodiments of device discovery as described herein, specific actions in specific time intervals may be specified as part of device discovery. A wireless device, such as computing device 210, may be configured to operate in accordance with these additional specified parameters of device discovery.

FIG. 3A illustrates actions performed by a wireless device in accordance with such a device discovery process. In this example, specific actions taken during discovery are not specified as part of the Wi-Fi Direct protocol. However, the proposed actions during device discovery may be consistent with parameters of device discovery that are specified. As a specific example, the Wi-Fi Direct protocol may specify that during the scan phase of discovery, a wireless device seeking discoverable devices may transmit a probe request on each of three social channels on average once every 500 milliseconds.

FIG. 3A illustrates a timing sequence for a single wireless device during scan. In some embodiments, the timing sequence illustrated by FIGS. 3A, 3B and FIG. 4 may be performed under control of software, such as operating system 230 in a computing device. Accordingly, multiple computing devices may be configured to perform discovery operations in accordance with the timing sequence illustrated. Two devices, each performing discovery operations in accordance with the illustrated timing sequences, might discover each other. In this example, the operations illustrated in FIGS. 3A, 3B and FIG. 4, if performed by two wireless devices within communication range of one another will lead to a high likelihood that one will discover the other. For the specific numerical examples provided in FIGS. 3A, 3B and FIG. 4, that high likelihood may be greater than 95%, such as 98%. The probability may be computed based on the percentage of time in one scan cycle that one of the devices will be listening on a specific channel while the other of the devices is transmitting on the same channel.

In this example, the scan phase illustrated in FIG. 3A includes multiple scanning cycles. In this example, three scanning cycles $C_1$, $C_2$, and $C_3$ are illustrated. However, it should be appreciated that the number of scanning cycles for a scan is not a limitation on the invention. In some embodiments, more than three scanning cycles may be performed. Conversely, in other embodiments, less than three scanning cycles may be performed.

The number of scanning cycles in a scan may impact the maximum amount of time spent on a scan. The power consumed by a scan may also increase in proportion to the number of scanning cycles performed. Though, the probability that a discoverable device will be discovered during a scan increases with the number of scanning cycles. In the example illustrated in FIG. 3A in which performing a scanning cycle yields a 98% probability of device discovery, performing two scan cycles results in a 99.96% probability of device discovery. Performing three scanning cycles results in a 99.992% probability of device discovery.

In some scenarios, a user of a wireless device may experience desirable performance from having a relatively short scan phase, even if a small percentage of the time a discoverable wireless device is not discovered. Such a scenario may exist, for example, for a wireless device that connects to other wireless devices that are visible to a user. In such a scenario, a user may input a command to a wireless device to scan for, and ultimately connect to, an available wireless device only when the user can see a remote wireless device. In that scenario, the user may expect the wireless device to promptly respond to a command to discover and connect to the remote wireless device and therefore may experience frustration or dissatisfaction with the operation of the wireless device from a long scan phase. In instances in which the remote device, though available, is not discovered during the relatively short scan phase, the user may input the command to perform a scan again. A wireless device operating in such a scenario may provide greater user satisfaction if it is configured to perform a short scan phase, such as by using only one scanning cycle.

In other scenarios, a user may be dissatisfied with the performance of a computing device if it fails to discover a remote wireless device that is discoverable. Such a scenario, for example, may exist when a user would like the wireless device to connect to a remote wireless device whenever available, but the user may not have outside information indicating whether or not such a remote wireless device is discoverable. For example, a user of a wireless computing device may experience frustration upon noticing that other users of other wireless computing devices are accessing a service through a discovered remote device but the user's wireless computing device did not discover and therefore connect to the service. In such a scenario, the wireless computing device may be configured to perform two or more scanning cycles.

Regardless of the number of scanning cycles performed, each of the scanning cycles may have the same format. In the example illustrated in FIG. 3A, each of the scanning cycles $C_1$, $C_2$ and $C_3$ may have a fixed duration. In this example, the duration of each scanning cycle is five seconds. This duration may be selected as being a fraction of a conventional scan cycle. As a specific example, the duration of each scanning cycle may be selected to be approximately half the duration of a conventional scanning cycle. Though, it should be appreciated that the duration of each of the scanning cycles is not critical to the invention, and each scanning cycle may have any suitable duration.

Regardless of the duration, each of the scanning cycles may be divided into the same number of intervals. In this example, each of the scanning cycles is divided into multiple intervals, each of which has the same duration. In this example, each of the intervals has a duration of 500 milliseconds. Accordingly, FIG. 3A shows that scanning cycle $C_2$ is divided into intervals $I_{2,1}$, $I_{2,2}$, $I_{2,3}$ ... $I_{2,N}$.

In this example, one of the intervals is designated as an extended scan interval. In FIG. 3A, interval $I_{2,N}$ is designated as the extended scan interval. In the example illustrated, the specific one of the intervals designated as the extended scan interval may be randomly selected. Accordingly, FIG. 3B, illustrating the format of a subsequent scan cycle, cycle $C_3$, shows a different one of the intervals designated as the extended scan interval. In the example of FIG. 3B, cycle $C_3$ is divided into intervals $I_{3,1}$, $I_{3,2}$, $I_{3,3}$, ... $I_{3,N}$. The interval $I_{3,2}$ has been designated as the extended scan interval. Though, it should be appreciated that, because the interval designated as the extended scan interval is randomly selected, in any scan cycle, any of the intervals may be designated as the extended scan interval.

In each of the intervals of a scan cycle, a wireless device performing device discovery may scan multiple channels. The specific channels scanned may depend on the designation of the interval. In some protocols, the frequency spectrum used for wireless communications may be divided into multiple channels of different types. A first type of channel may be used generally for forming connections between devices. A second type of channel may be referred to as a social channel. The social channels may be designated as channels to be preferentially used for devices seeking to discover one another. In accordance with some protocols, channels designated as social channels may not be used for forming connections between devices.

In accordance with the implementation of a scan phase illustrated in FIGS. 3A and 3B, scanning during the extended scan interval may entail visiting one or more of the first type channels. In this context, visiting a channel may entail transmitting a discovery message in that channel and waiting to determine whether a remote device responded to the discovery message.

The number of channels of the first type visited during an extended scan interval is not critical to the invention, and may depend on the number of channels defined for the specific peer-to-peer protocol in use. In some embodiments, the extended scan interval may include visiting every channel of the first type. Though, in some protocols, some channels may be designated as active scan channels and others may be designated as passive scan channels. A device operating according to that protocol may transmit a probe request in a channel designated as an active scan channel. However, the protocol may prohibit transmission of probe request messages in channels designated as passive scan channels. For discovery in accordance with a protocol that designates channels as active scan channels and passive scan channels, scanning during an extended scan interval may entail visiting only active scan channels.

The number of active scan channels visited during an extended scan interval is not critical to the invention. Though, in some embodiments, every active scan channel may be visited at least once during an extended scan interval. In some embodiments, each active scan channel may be visited more than once during an extended interval. However, the number of times that each active scan channel is visited during an extended scan interval is also not critical to the invention.

The duration of a "visit" to a channel is not critical to the invention and may depend on the peer-to-peer protocol being used. For example, a protocol may specify a maximum response time to a probe request message. This time may dictate the duration of a visit to a channel. For example, the Wi-Fi Direct protocol may specify that a device receiving a probe request will respond within a time that allows a device sending a probe request to receive the response within 20 milliseconds. In such a scenario, the duration of a visit may be 20 milliseconds. Though, it should be recognized that any suitable duration of a visit may be applied The timing of the visits to the channels within the extended scan interval also is not critical to the invention. In some embodiments, the channels may be visited in random order at random times within the extended scan interval. Though, in other embodiments, the channels may be visited in a predetermined order, which is the same in every extended scan interval. The visits may be sequential or separated by any suitable amount of time.

During each interval that is not designated as an extended scan interval, the device performing the scan in accordance with the timeline of FIGS. 3A and 3B may visit channels of the second type. In some embodiments, during each of the intervals of a cycle, other than the extended scan interval, a device may visit each social channel. The visits to the social channels may occur in any suitable order, with any suitable timing. Also any suitable number of visits to each social channel may occur during each interval. However, FIG. 4 illustrates an example of the pattern of visits in accordance with some embodiments.

Figure 4:
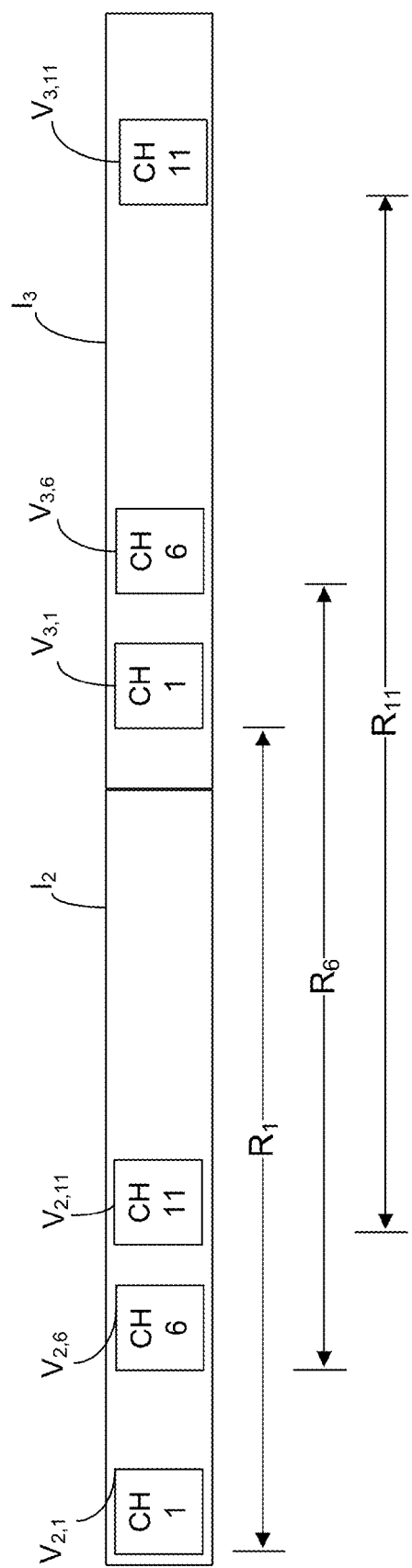
FIG. 4 is a timing diagram of a further aspect of the scan phase illustrated in FIGS. 3A and 3B.

FIG. 4 illustrates two successive intervals, intervals I2 and I3. In the example of FIG. 4, the protocol specifies three social channels, designated as CH1, CH6 and CH11. Though, it should be appreciated that any suitable number of social channels may be designated in accordance with a protocol.

In this example, each of the intervals includes a visit to each of the social channels. Visit $V_{2,1}$ illustrates a visit to social channel CH1 during interval $I_2$. Similarly, visit $V_{2,6}$ and $V_{2,11}$ represent visits to social channels CH6 and CH11, respectively, during interval $I_2$. Visits $V_{3,1}$, $V_{3,6}$ and $V_{3,11}$ represent visits to social channels CH1, CH6 and CH11, respectively, during interval $I_3$.

In the embodiment illustrated, from interval to interval, the time between visits to the same channel varies. In the embodiment illustrated in FIG. 4 this timing varies randomly. For example, FIG. 4 illustrates that the time between visits to social channel CH1 in the successive intervals $I_2$ and $I_3$ is $R_1$. Similarly, the time between successive visits to social channel CH6 is time $R_6$. The time between successive visits to social channel CH11 is time $R_{11}$. As can be seen, the times $R_1$, $R_6$ and $R_{11}$ are different. In this example, the difference in times arises because the timing of each of the visits in interval $I_3$ is randomly selected relative to a visit to the same channel in the preceding interval, interval $I_2$.

Though the time between successive visits to the same social channel is randomly selected, the selection is made in a way that provides an average, visit frequency to each of the social channel that equals a predetermined frequency. The visit frequency may be predetermined based on a peer-to-peer protocol. For example, the peer-to-peer protocol may specify that each social channel is visited, on average every 500 milliseconds. Though, the specific visit frequency is not critical to the invention.

The specific approach for selecting visit times to yield the desired visit frequency also is not critical to the invention. However, in some embodiments, the visits to each social channel in an interval may be selected from a range of times that is a fixed time following the visit to the same channel in the preceding interval. As a specific example, time $R_1$ may be determined by identifying a range of times between 400 milliseconds and 500 milliseconds following the start of visit $V_{2,1}$. By selecting a time from this range in accordance with the uniform distribution, the average spacing between successive visits to social channel CH1 may be 450 milliseconds. When other time during a scan cycle, such as time in the extended scan interval when no visits to the social channel are scheduled is considered, each social channel may be visited at a desired rate. That rate may have any specific numerical value, and the start and/or the end of the range of times from which the scheduled visit time is selected may be adjusted to yield any desired average rate of visits to each of the social channels.

In the embodiment illustrated, the average rate of visits to each of the social channels is the same. Accordingly, though the times $R_6$ and $R_{11}$ may be different, between intervals $I_2$ and $I_3$ each of the times $R_6$ and $R_{11}$ may be selected in the same way as time $R_1$. Though because each is randomly selected from a range, the timing between visits to social channels may vary from channel to channel, from interval to interval within a scan cycle and across scan cycles.

FIGS. 3A, 3B and FIG. 4 illustrate times during a scan in which a wireless device seeking to discover a remote wireless device transmits probe requests. Periods of time during which the device is listening for probe requests transmitted by remote devices are not expressly indicated. However, in some embodiments, a wireless device performing a scan may listen for probe requests at one or more times during a scan cycle when it is not visiting any of the channels. In some embodiments, a device performing a scan may listen for probe requests at all times when it is not visiting a channel. Though, in other embodiments, the wireless device may listen for probe requests only during a portion of the time when it is not visiting channels. In conjunction with such an approach, the wireless device may turn off its radio to save power when not visiting a channel or listening for probe requests. Though, the specific timing of listen intervals, and whether the wireless device turns off its radio to save power, are not critical to the invention.

Figure 5A:
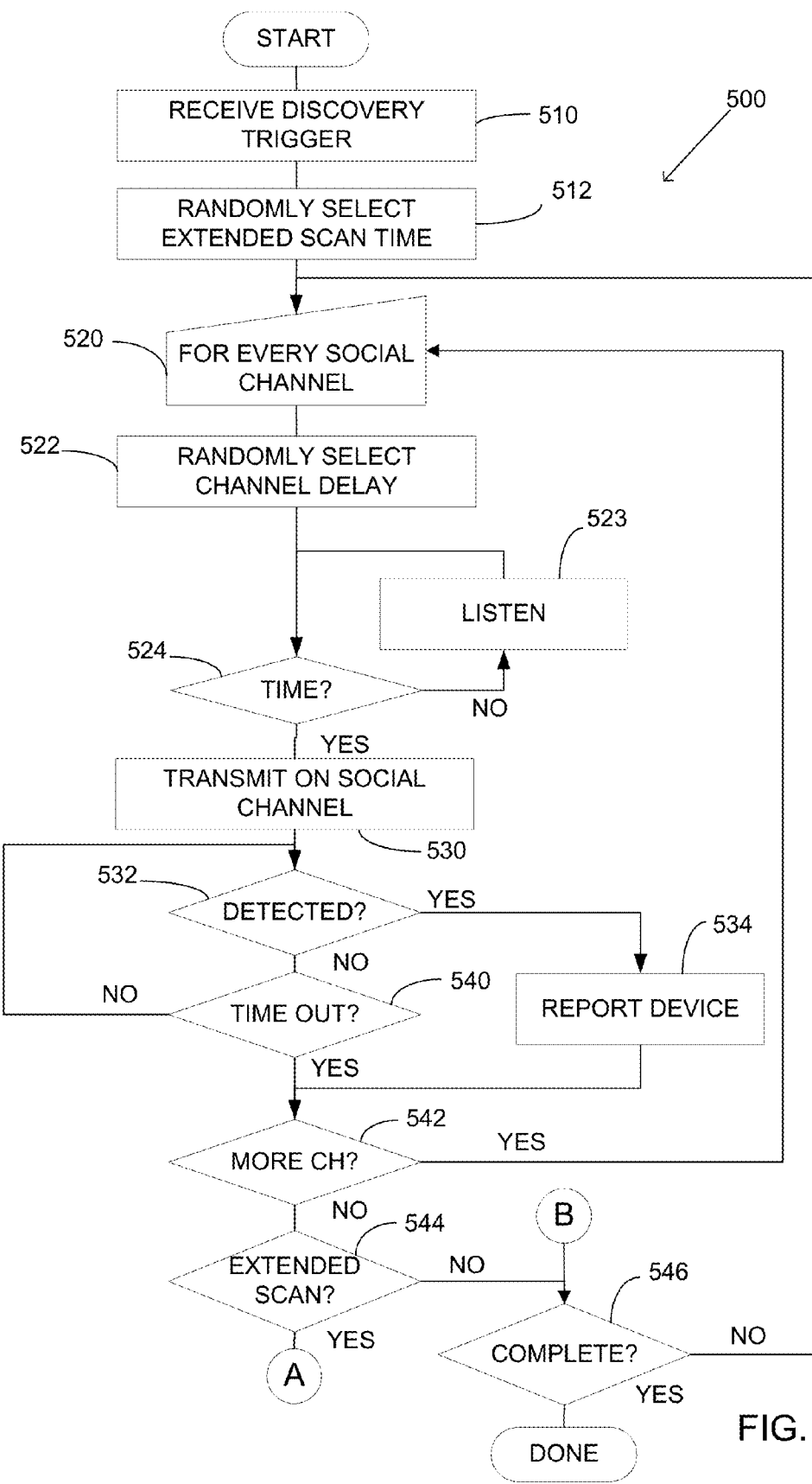
FIGS. 5A and 5B, when connected together at the points labeled A-A and B-B, are a flow chart of an exemplary method of operating a device to scan for remote devices as part of device discovery that is compatible with a peer-to-peer protocol.
Figure 5B:
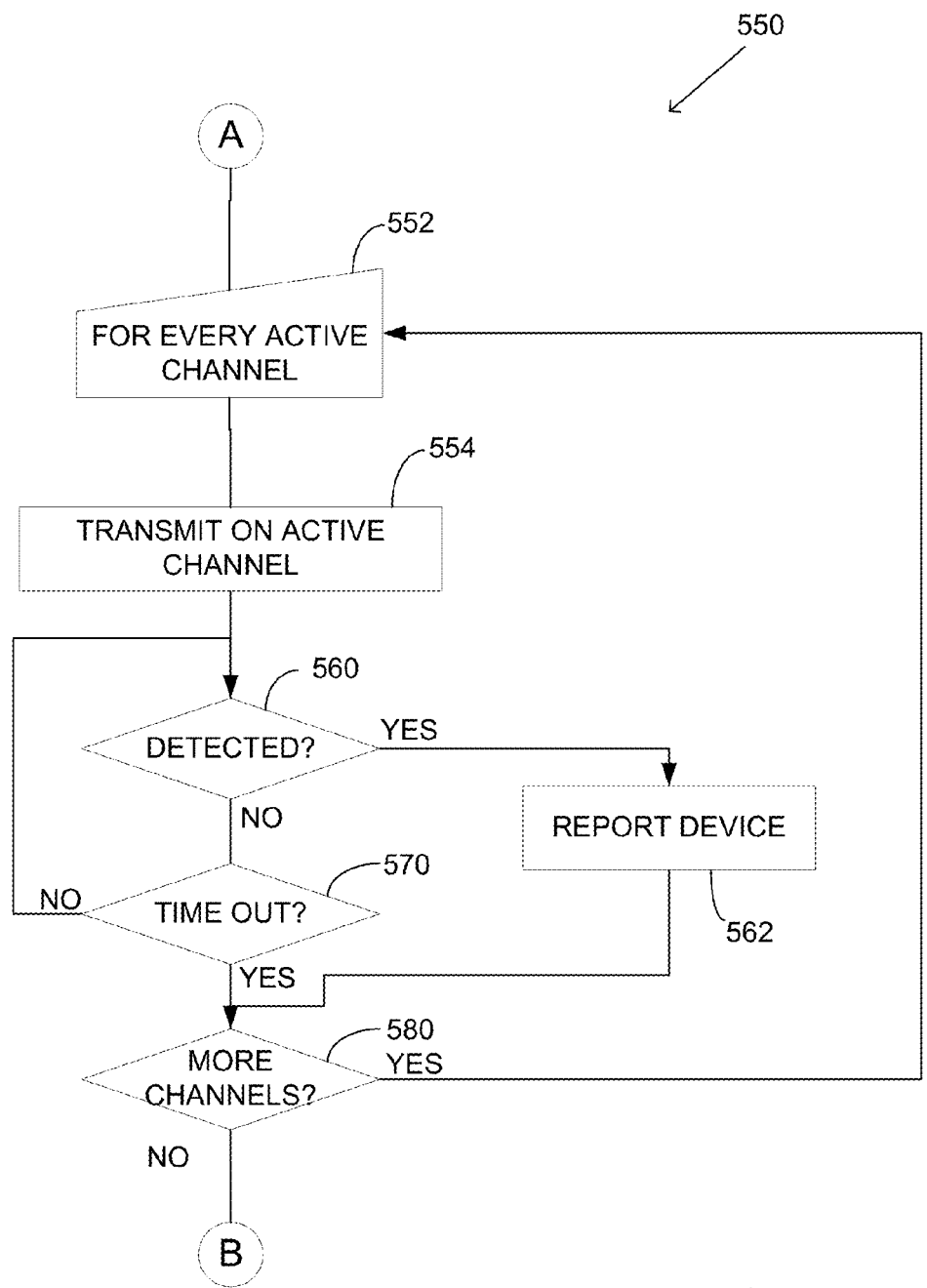

FIGS. 5A and 5B illustrate a method 500 by which a wireless device may operate to implement a scan as illustrated in FIGS. 3A, 3B and FIG. 4. In this example, the method 500 begins at block 510 where the device receives a trigger, causing it to initiate discovery. The trigger may be any suitable event, including express user input in the form of a command directing the device to discover remote wireless devices available for a peer-to-peer connection. Though, in other scenarios the trigger may be implicit user input.

As an example of implicit user input, a user may input to a computing device a command to perform a function involving interaction with a remote wireless device. In response to such a command, the computing device may initiate device discovery to determine whether a peer-to-peer connection may be formed to such a device. Though, it should be appreciated that other mechanisms may be used trigger discovery, including random or periodic events. Accordingly, it should be appreciated that the specific event that triggers discovery at block 510 is not critical to the invention.

Regardless of the specific trigger that initiates device discovery, method 500 may proceed to block 512. At block 512, the device may randomly select an extended scan time. Selection of an extended scan time may entail selecting one of a plurality of intervals in a scan cycle during which an extended scan may be performed. Any suitable technique for making a random selection may be employed. In this context, random selection need not be based on a statistically random quantity. Rather, the random selection performed at block 512 may simply yield a time that varies from cycle to cycle and is not correlated to times that may be selected in remote devices that may similarly perform an extended scan.

Regardless of the manner in which the extended scan time is selected, processing proceeds to loop start 520. Loop start 520 represents the start of processing that is performed for each of multiple intervals in a scan cycle. Processing in such a loop may be performed for every social channel to be visited as part of the scan.

For a selected social channel, processing proceeds to block 522. At block 522, a time for a visit to the social channel is selected. In this example, the time for a visit is randomly selected relative to a visit to that social channel in a prior interval.

The time for a visit to the social channel may be randomly selected as described above in connection with FIG. 4. Such an approach may be appropriate for each interval following the first. For the first interval, the time of the visit may be selected in any suitable way, including randomly. Similarly, for an interval, following an extended scan interval the time for a visit to a social channel may be selected in any suitable way, including randomly, rather than as a random time following a visit in a prior interval. Though, it should be appreciated that in any interval, the time of a visit to a social channel may be selected in any suitable way so as to provide a desired time between visits to the social channel.

Regardless in the manner in which the time for a visit to the social channel is selected, processing may proceed to decision block 524. At decision block 524, method 500 may loop back to decision block 524 through block 523 if the scheduled time for the channel visit has not been reached. At block 523, the wireless device executing method 500 may be listening for probe requests from remote devices. The wireless device may be listening on one or more channels. In some embodiments, each device may be assigned a home channel. Listening at block 523 may entail listening on the home channel of the device. The home channel may be one of the social channels. Alternatively, the home channel may be an active scan channel. If the home channel is not an active scan channel the device may listen on another channel that is an active scan channel. Though not illustrated in FIG. 5A, if listening at block 523 detects a probe request, the probe request may be processed. The processing may entail identifying the device that sent the probe request and responding to it. Processing the probe request alternatively or additionally may entail treating the sending device as discovered. The device may be reported as described below in connection with block 534 or in any other suitable way.

When the scheduled time for a visit to a social channel is reached, method 500 may branch from decision block 524 to block 530. A visit to the social channel may entail transmitting one or more probe requests and listening for a probe response.

Accordingly, at block 530, a discovery message may be transmitted on the selected social channel. In accordance with some embodiments, the discovery message may be a probe request. In this example, a single discovery message is transmitted at block 530. Though, in other embodiments, multiple discovery messages may be transmitted.

Regardless of the number and format of the transmitted discovery messages, method 500 may proceed to decision block 532. If a response to the discovery message is detected, method 500 may branch at decision block 532. At block 534, a device that sent the detected probe response may be identified. The identified device may then be reported.

Reporting of a device at block 534 may occur in any suitable way, and the specific processing at block 534 may depend on the nature of the wireless device executing the method 500. For example, in embodiments in which method 500 is being executed by a wireless computing device in response to a user request to display remote wireless devices available for a connection, reporting the device at block 534 may entail presenting to the user an indication of the discovered wireless device. In other embodiments, reporting at block 534 may entail storing a record of the device or taking any other suitable action.

Conversely, if a response is not detected at decision block 532, method 500 may proceed to decision block 540. At decision block 540, method 500 may loop back, depending on whether the time that the wireless device will wait for a response to a probe request has expired. That time may be based on the dwell time for a visit, which may set the total duration of a visit to a channel. That time may be determined at any suitable way and may be specified as a parameter of a peer-to-peer protocol. For example, in accordance with some protocols, a device may wait for 20 milliseconds for a response to a probe request.

Regardless of the specific length of the time out period, if the time has not expired, method 500 may loop back from decision block 540 to decision block 532. At decision block 532, the device executing method 500 may again determine whether a response to the probe request transmitted at block 530 has been received.

Conversely, if the time out period has expired when processing reaches decision block 540, method 500 may branch from decision block 540 to decision block 542. When processing reaches decision block 542, a visit to the selected social channel has been completed. If more social channels remain to be visited, method 500 loops back from decision block 542 to loop start 520 where the next social channel is selected and processed.

Conversely, if no further social channels remain for processing in the iteration of the scanning cycle depicted in FIG. 5A, method 500 may branch from decision block 542 to decision block 544. At decision block 544, the method 500 may branch, depending on whether the selected time for an extended scan interval has been reached. If so, method 500 branches from decision block 544 to perform subprocess 550 (FIG. 5B). Conversely, if the time for an extended scan interval has not been reached, method 500 branches from decision block 544 to decision block 546.

At decision block 546, method 500 may again branch, depending on whether the processing for the scanning cycle has been completed. If the scanning cycle has not been completed, method 500 loops back to loop start 520 where processing for another scanning interval is begun. Conversely, if the scanning cycle has been completed, method 500 may branch from decision block 546 to the end.

In the example of FIG. 5A, a single scanning cycle is performed. Though, it should be appreciated that, in some embodiments, multiple scanning cycles may be performed as part of a scan. In such embodiments, though not illustrated in FIG. 5A, rather than ending after decision block 546, the method 500 may loop back to block 510 where a further scanning cycle may begin.

FIG. 5B illustrates a subprocess 550 that may be performed during an extended scan interval. Subprocess 550 begins at loop start 552. In this example, loop start 552 is the beginning of a loop performed for every active scan channel in use. Though, it should be appreciated that an extended scan cycle need not scan in every possible active scan channel and the loop started at loop start 552 may be performed over any suitable number of active scan channels.

From loop start 552, subprocess 550 continues to block 554. At block 554, the wireless device performing subprocess 550 may transmit a discovery message on the selected active scan channel. Any suitable format of a discovery message may be transmitted at block 554. The format may be the same as transmitted at block 530. Though, different or additional message formats may be transmitted at block 554, as the invention is not limited in this respect.

From block 554, subprocess 550 continues to decision block 560. At decision block 560, subprocess 550 branches, depending on whether a response to the discovery message has been detected. If a response has been detected, subprocess 550 branches from decision block 550 to block 562. At block 562, the device that transmitted the response detected at decision block at 560 may be identified. Any suitable processing may be used to identify the device, including reading information from the message received as the response. This information may be used to report the device. Processing at block 562 may be performed in any suitable way, including as described above in connection with block 534.

Regardless of the manner in which the discovered device is reported, processing may then proceed from block 562 to decision block 580. At decision block 580, subprocess 550 may branch, depending on whether more active scan channels remain to be visited. If so, subprocess 550 may loop back to loop start 552 where the next active channel is selected from processing. Conversely, when all of the active scan channels have been processed as part of subprocess 550, subprocess 550 may branch from decision block 580 to decision block 546 (FIG. 5A), where the scan may complete or loop back for a further interval.

Conversely, if, a response is not detected at decision block 560, subprocess 550 may continue to decision block 570. Subprocess 550 may again branch, depending on whether the device has waited for a response to the discovery message transmitted at block 554 for more than the dwell time of a visit to an active scan channel. If not, subprocess 550 may loop back to decision block 560 where a check is again made for a response to the discovery message.

Conversely, if the time out period has been reached, subprocess 550 continues to decision block 580 for processing as described above.

FIGS. 5A and 5B illustrate processing that may be performed by one or more devices seeking to discover remote wireless devices. Wireless devices may perform different or additional processing to aid in discovery. In some embodiments for example, a peer-to-peer device that has already joined a group and is operating as a group owner, may periodically transmit messages that may aid other devices in discovering that group or device. For example, a device performing discovery according to the method 500 may detect such a transmission while listening in block 523. In some embodiments, each group owner may transmit periodic messages on the channel that it is using for communication with other group members. These messages may serve to announce the presence of the group owned and may have any suitable format, including the format of messages transmitted at block 530 (FIG. 5A) or block 554 (FIG. 5B). Though, messages transmitted by a group owner may have a different format. Regardless, such messages may aid in the discovery process by allowing a remote device to detect the group owner as a result of receiving such a message.

Figure 6:
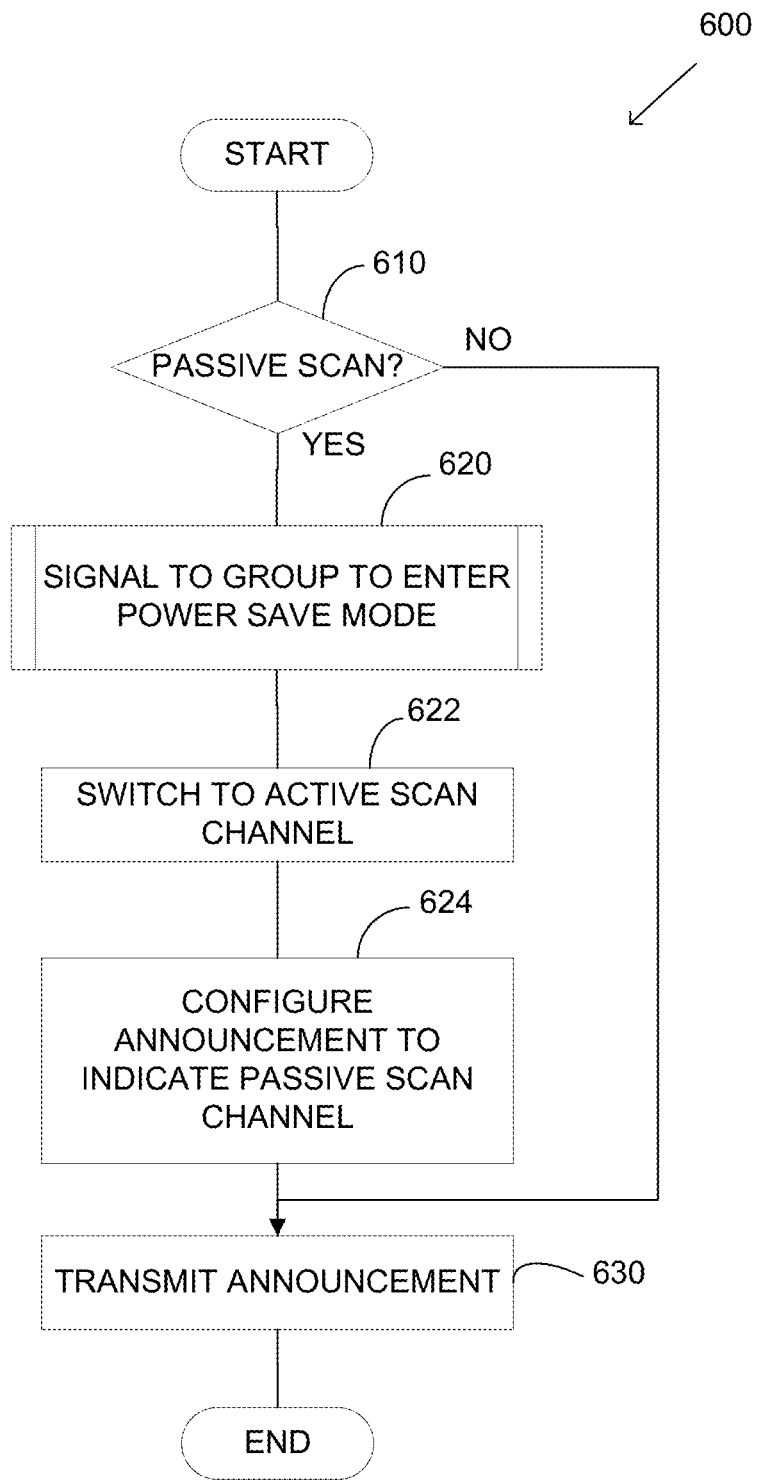
FIG. 6 is a flow chart of an exemplary method of operating a wireless device configured as a group owner is accordance with a peer-to-peer protocol.

The technique of transmitting announcement messages on the channel used by a group owner to facilitate discovery may be appropriate only in some circumstances. Specifically, if the group owner is operating on a channel designated as a passive scan channel, transmissions of messages serving to announce the presence of the group owner to aid discovery may be prohibited in accordance with the protocol used for peer-to-peer communication. FIG. 6 illustrates a method by which a group owner may operate to announce its presence while complying with a protocol that prohibits transmissions of such announcements in a passive scan channel.

Method 600 begins at decision block 610. At decision block 610, method 600 branches, depending on whether the wireless device executing method 600 is operating in a passive scan channel. If not, method 600 branches from decision block 610 to block 630. At block 630, the device executing the method 600 transmits a message formatted as an announcement of the wireless device configured as a group owner. Such a message may have any suitable format and may be in accordance with a peer-to-peer protocol in use by the group owner.

When the device is operating on a passive scan channel, method 600 may branch from decision block 610 to subprocess 620. At subprocess 620, the device may execute steps in a process to signal to other devices in its group that it is entering a power saving mode. The specific steps performed at subprocess 620 are not critical to the invention and may be performed in accordance with a known protocol. For example, the Wi-Fi Direct protocol specifies messages by which a group owner can signal to other devices that it will be unavailable for communications for a period of time. Such a subprocess is included in the protocol to allow the group owner from time-to-time, to enter a power saving mode in which its radio is turned off. While operating in such a low power mode with its radio off, the group owner does not communicate with other devices in its group. Absent such a power saving mode an extended period without communication, might be interpreted by the devices as signifying that the group owner is no longer operating as a group owner such that the group is dissolved. Though, when the power saving mode is used, other devices in the group do not interpret lack of communication from the group owner as an indication that the group has been dissolved.

In method 600, performing the steps to enter a low power mode in subprocess 620 are used for adherent purpose. In this example, subprocess 620 is an example of a mechanism by which the group owner may alert remote devices that it will not be communicating normally but, at a later time, will resume normal communication.

Accordingly, following subprocess 620, the group owner executing method 600 may cease communications on its normal channel. At block 622, communications in the normal channel used by the group owner are temporarily ended when the device switches its radio to an active scan channel. In embodiments in which the device executing method 600 has a single radio or, for some other reason, supports communications on a single channel at time, switching to an active scan channel at block 622 ends communication in the passive scan channel that the wireless device was using for communication among other devices in a group. Though, as a result of executing of subprocess 620 ceasing communications in the passive scan channel does not dissolve the group.

Nonetheless, because the device is then configured for communication in an active scan channel, it may transmit announcement messages in that channel. At block 624, the device formats an announcement message for transmission in the active scan channel. In this case, the announcement, in addition to indicating information about the device or the group, indicates that the device is using a passive scan channel for normal communication among the group. The specific passive scan channel on which the group is operating may also be indicated. Any suitable message format may be used for representing this announcement information.

Regardless of the format of the message configured at block 624, method 600 may proceed to block 630 where the message is transmitted. Following transmission of the announcement, FIG. 6 shows that method 600 ends. Though, it should be appreciated that the announcement may be transmitted multiple times or any other actions may be performed before subprocess 600 is ended.

Processing as described above may be used to support any suitable functions that may be performed by a wireless device. These functions may be performed in response to direct user input, implied user input or in response to any suitable trigger conditions. FIG. 7A illustrates an example of a scenario in which a discovery method as described above may be triggered.

FIG. 7A illustrates a user interface 700. User interface 700 may be presented on a display of a wireless computing device, such as computing device 110 (FIG. 1). In this example, user interface 700 is generated by a component of an operating system of the computing device. Specifically, in this example, user interface 700 is generated by a device manager component within the operating system of a computing device.

User interface 700 includes a control 710 by which a user may input a command that triggers the computing device to initiate a scan as described above. In this example, control 710 may be accessed by a user when a user is seeking to connect to a wireless device.

In the state shown, user interface 700 does not depict any available wireless devices for a connection. User interface 700 is illustrated in FIG. 7A in a state before discovery, as described above is performed.

Figure 7B:
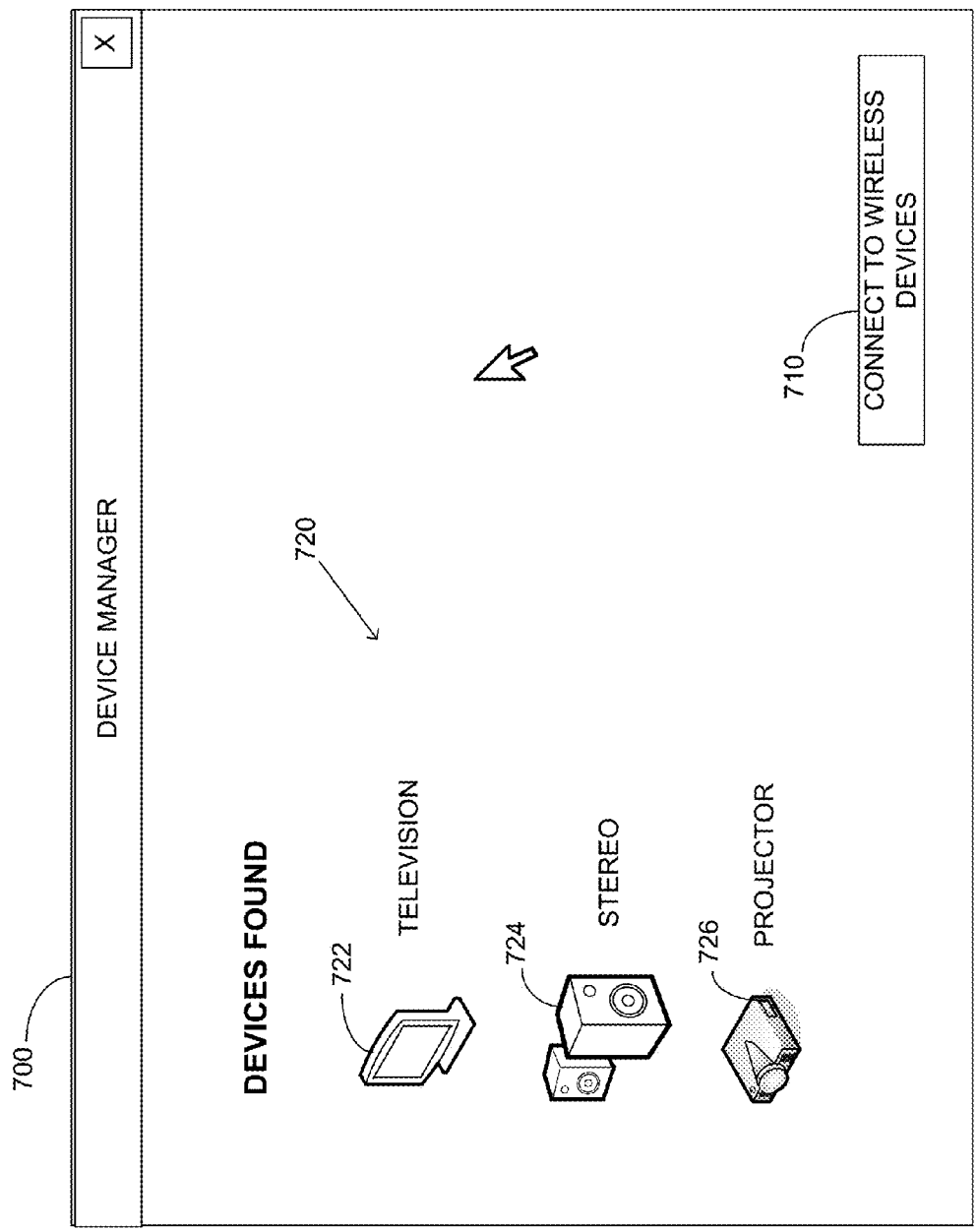

FIG. 7B illustrates user interface 700 after device discovery has been performed. In this example, user interface 700 contains a list 720 of devices found during a scan. In this example, user interface 700 contains icons 722, 724 and 726, each indicating a device found during a scan. In embodiments in which a scan is performed according to the timing diagram illustrated in connection with FIGS. 3A and 3B and FIG. 4, the list 720 of devices may be generated in a time that is perceived by the user to be relatively short. Though the length of time required for the computing device to generate the list 720 of devices found through device discovery may be dictated heavily by the timing of operations during device discovery, the user may view a slow response as an indication of poor performance of the computing device or its operating system. Conversely, a fast response may lead to a favorable impression of the performance of the computing device or its operating system.

Device discovery as described above may be performed relatively quickly by using a relatively small number of scanning cycles or scanning cycles of relatively short duration. As a specific example, a single scanning cycle of 5 seconds may be used, allowing a device manager to present list 720 in less than 5 seconds.

As described above, device discovery that includes a single scanning cycle may have a relatively high likelihood of discovering any available device. However, a tradeoff for a relatively fast time may be that in some scenarios, no devices are discovered, even though a discoverable device was present. Accordingly, in some embodiments, the device manager generating user interface 700 may be configured to respond to completion of a scan without discovering a device. In some embodiments, a subsequent scanning cycle may be performed. In other embodiments, upon completing a scan without discovering any devices, a find phase may be performed. The find phase may be performed using techniques as are known in the art or any other suitable processing.

Though, in some embodiments, upon completion of a relatively short scan phase without discovering any devices, the user may be alerted and offered the possibility of scanning again. FIG. 7C illustrates a graphical user interface that may be presented by a device manager upon completion of a scan phase without identifying any devices. In this example, user interface 700 includes a notification 730, reporting to the user that the scan was completed without identifying any available devices. In addition, user interface 700, in the configuration illustrated in FIG. 7C, includes a control 732 allowing the user to provide input to cause another scan. In this example, the user input triggers the scan to be performed again, without a find phase being performed.

By repeating the scan, the user has the option to dynamically determine the amount of time spent on device discovery. This time is proportional to power which may also be a concern to a user of a wireless device operating on battery power. Though, the user also has the ability to control the thoroughness of the scan, and the likelihood that if a discoverable device exists it will be found by the scan. Other mechanisms may be used to allow a user to provide input controlling this tradeoff between certainty of discovering a remote wireless device and the amount of power or time consumed.

FIG. 8 illustrates a further user interface 800 that may be presented by a device manager or other suitable component of an operating system of a computing device. In this example, user interface 800 may allow a user to dynamically specify a parameter controlling operation of the wireless device that impacts the amount of time spent scanning during device discovery. In this example, user interface 800 includes a control 810 that allows a user to specify a parameter value. In this example, control 810 is presented as a segmented bar. The segmented bar contains segments $812_1 \ldots 812_{10}$. These bars are ordered to correspond to successively increasing likelihood of device discovery. A user may select any of the segments $812_1 \ldots 812_{10}$ to indicate the desired likelihood of device discovery acceptable to the user.

For example, by selecting segment $812_1$, the user may indicate that the user prefers a fast, lower power scan phase, but is willing to accept a relatively low likelihood of device discovery. In response to selection of segment $812_1$, the device manager may tailor the timing of operations as part of the scan to include a relatively low number of scanning cycles of relatively short duration.

Each successive bar segment may be interpreted by the device manager as a user input indicating that a longer scan is acceptable, but the user prefers greater certainty that a discoverable device, if one exists, will be discovered during the scan. For example, segment $812_9$ may correspond to an indication that the user is seeking a guarantee that 98% of the time when a discoverable device exists, it will be identified during the scan. In the embodiment described above, this level of performance may be achieved by a single scanning cycle of approximately 5 second duration. Though, the specific settings by which the user-indicated performance level is achieved are not critical to the invention.

In this example, user interface 800 includes a further segment $812_{10}$, indicating greater certainty then the 98% indicated by segment $812_9$. Such greater certainty may be achieved in any suitable way. For example, multiple scanning cycles may be performed as part of device discovery. Alternatively or additionally a find phase may be performed following a scan phase.

Though, it should be appreciated that FIG. 8 serves as a graphical illustration of one approach for setting parameters of a scan. The parameters may be pre-programmed into a wireless device. Alternatively or additionally, the parameters may be set by an application when loaded on a computing device, programmed on a network interface card through a firmware update or supplied in any other suitable way.

Figure 9:
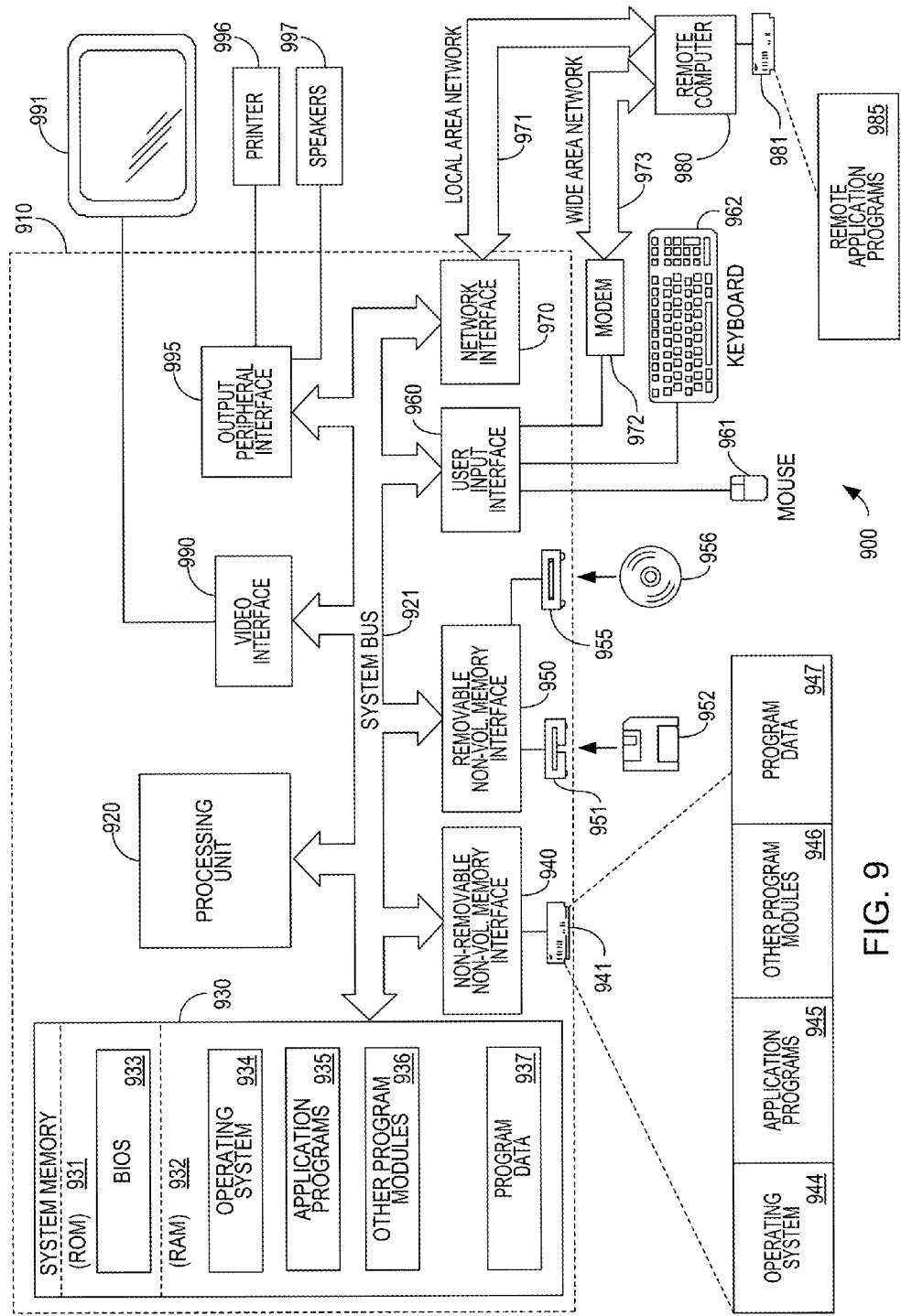
FIG. 9 is a sketch of an illustrative computing device in which some embodiments of the invention may be practiced.

FIG. 9 illustrates an example of a suitable computing system environment 900 on which the invention may be implemented. The computing system, for example may represent any suitable wireless device that may seek to discover or may be discovered using the techniques as described above. However, it should be appreciated that wireless devices, need not be formatted as computing devices. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a wireless device to discover one or more other wireless devices on a frequency spectrum comprising a plurality of active-scan channels and a plurality of social channels, the method comprising:
   during a scanning cycle that includes a plurality of time intervals:
      selecting an interval of the plurality of time intervals to be an extended scan interval;
      during the extended scan interval, transmitting a probe request and listening for a probe response in each of the plurality of active-scan channels, each active-scan channel being a channel on which the wireless device is configured to announce its presence;
      during each of the plurality of time intervals that is not the extended scan interval:
         selecting a visit time for each of the plurality of social channels, the visit times being randomly selected from a specified range of visit times to provide a predetermined average time between visits to each of the social channels, each social channel being a channel that is designated to be preferentially used for one or more devices seeking to discover one or more other devices; and
         at the selected visit time for each of the plurality social channels, transmitting at least one message and listening for a response on the social channel.

2. The method of claim 1, wherein selecting the time of the extended scan interval comprises:
   randomly selecting an interval of the plurality of time intervals to be designated as the extended scan interval, the plurality of time intervals corresponding to a plurality of respective times.

3. The method of claim 1, wherein the scanning cycle has a duration between 3 seconds and 7 seconds.

4. The method of claim 1, wherein the range is between 400 and 500 msec following a visit time for the specified social channel in a preceding time interval.

5. The method of claim 1, wherein the predetermined average time is 450 msec.

6. The method of claim 1, further comprising:
   during the scanning cycle, listening for a probe request in at least one listen channel, each listen channel being a channel on which the wireless device is configured to listen for one or more discovery messages sent by one or more other devices.

7. At least one computer-readable storage device comprising computer-executable instructions, that, when executed by at least one processor, perform a method of operating a wireless device in an environment comprising a plurality of channels in a first group and a plurality of channels in a second group, the method comprising:
   during a scanning cycle divided into a plurality of time intervals:
      for a first interval of the plurality of time intervals, performing an extended scan by transmitting a message and listening for a response in each channel of the first group of channels; and
      for each of the plurality of time intervals that is not the first interval, transmitting at least one message and listening for a response in each channel of the second group of channels, wherein a time at which a designated channel in the second group is visited is randomly selected relative to a time at which the designated channel is visited in a prior time interval to provide a predetermined average time between visits to the designated channel.

8. The at least one computer-readable storage device of claim 7, wherein the method further comprises:
   randomly selecting the first interval from the plurality of time intervals for performance of the extended scan such that an order of the first interval among the plurality of time intervals varies from cycle to cycle.

9. The at least one computer-readable storage device of claim 7, wherein the first group of channels comprises active scan channels and the second group of channels comprises social channels, each active-scan channel being a channel on which the wireless device is configured to announce its presence, each social channel being a channel that is designated to be preferentially used for one or more devices seeking to discover one or more other devices.

10. The at least one computer-readable storage device of claim 9, wherein times for transmitting on each of the active scan channels and the social channels are selected to comply with a Wi-Fi Direct protocol while providing and result in greater than 95% probability that a discoverable device will be discovered in 5 seconds or less.

11. The at least one computer-readable storage device of claim 7, wherein the method further comprises:
   in response to transmission of messages in the first group of channels and the second group of channels during the scanning cycle not resulting in discovery of a device, repeating the transmission of the messages in a second scanning cycle without performing operations in accordance with a designated phase during which the wireless device uses only channels that are designated as social channels, each social channel being a channel that is designated to be preferentially used for one or more devices seeking to discover one or more other devices.

12. The at least one computer-readable storage device of claim 7, wherein the method further comprises:
   determining whether the wireless device is configured as a group owner of an established group operating on a passive scan channel, the passive scan channel being a channel on which transmission of a probe request message is prohibited;

in response to a determination that the wireless device is a group owner operating on a passive scan channel, communicating with devices in the established group in accordance with a protocol signifying that the group owner is entering a power saving mode; and transmitting over an active scan channel a message formatted in accordance with a discovery protocol, the active scan channel being a channel on which the wireless device is configured to announce its presence.

13. A network interface card comprising the at least one computer-readable storage device of claim 7.

14. The network interface card of claim 13, further comprising processing circuitry and a radio, the processing circuitry being configured to control the radio by executing the computer-executable instructions.

15. A wireless device comprising:

a radio configured to operate across a plurality of channels in accordance with a peer-to-peer protocol, the plurality of channels comprising a first group and a second group; and at least one processor configured to, in response to a command to discover a remote wireless device, perform a scan during a scanning cycle, the scanning cycle comprising a plurality of time intervals, the at least one processor configured to, in a first interval of the plurality of time intervals, visit each channel of the first group by transmitting a message on the channel and listening for a response, the at least one processor configured to, in each interval of the plurality of time intervals other than the first interval, visit each channel of the second group by transmitting at least one message on the channel and listening for a response, wherein a time at which a designated channel of the second group is visited is randomly selected relative to a time at which the designated channel is visited in a prior time interval to provide a predetermined average time between visits to the designated channel.

16. The wireless device of claim 15, wherein the at least one processor is further configured to control the radio during the scanning cycle to listen on at least one channel of the plurality of channels during at least a portion of a time during which the wireless device is not visiting channels in the first plurality of channels or the second plurality of channels.

17. The wireless device of claim 15, wherein the at least one processor is further configured to, in response to completing the scanning cycle without discovering a device, enter a designated phase during which the wireless device uses only channels that are designated as social channels, each social channel being a channel that is designated to be preferentially used for one or more devices seeking to discover one or more other devices.

18. The wireless device of claim 15, wherein the at least one processor is further configured to, in response to completing the scanning cycle without discovering a device, repeat the scan cycle without entering a designated phase during which the wireless device uses only channels that are designated as social channels, each social channel being a channel that is designated to be preferentially used for one or more devices seeking to discover one or more other devices.

19. The wireless device of claim 15, wherein the at least one processor is further configured to, in response to completing the scanning cycle without discovering a device:

evaluate input from a user of the wireless device to determine whether the user expects a discoverable device to be present; and selectively repeat the scanning cycle, without entering a designated phase, depending on whether the user expects the discoverable device to be present, the designated phase being a phase during which the wireless device uses only channels that are designated as social channels, each social channel being a channel that is designated to be preferentially used for one or more devices seeking to discover one or more other devices.

20. The wireless device of claim 15, wherein the peer-to-peer protocol is a Wi-Fi Direct protocol.

* * * * *